United States Patent [19]

Jankovic

[11] Patent Number: 5,602,752
[45] Date of Patent: Feb. 11, 1997

[54] SELF-LEARNING METHOD AND APPARATUS FOR DYNAMIC SYSTEM CHARACTERISATION AND SIMULATION

[76] Inventor: Ljubomir Jankovic, 81 Pershore Road, Kings Norton, Birmingham, B30 3EL, England

[21] Appl. No.: 303,382

[22] Filed: Sep. 9, 1994

[30] Foreign Application Priority Data

Sep. 11, 1993 [GB] United Kingdom ............... 9318875

[51] Int. Cl.⁶ ................................................ G01R 19/04
[52] U.S. Cl. ..................... 364/487; 364/557; 364/141; 364/178
[58] Field of Search ...................... 364/487, 557, 364/140, 141, 148, 153, 154, 178, 582, 715.06, 728.02; 122/448.1, 448.3; 348/404–406, 408, 297; 341/122–125; 236/78 B; 165/22

[56] References Cited

U.S. PATENT DOCUMENTS

| | | | |
|---|---|---|---|
| 4,373,663 | 2/1983 | Hammer | 122/448.1 |
| 4,714,961 | 12/1987 | Haubold et al. | 348/297 |
| 4,772,946 | 9/1988 | Hammer | 348/406 |
| 5,150,289 | 9/1992 | Badavas | 364/154 |
| 5,161,099 | 11/1992 | Yamaguchi | 364/154 |

OTHER PUBLICATIONS

British Patent Office Examiner's Search Report for Application No. GB 9418209.4.

Primary Examiner—Emanuel T. Voeltz
Assistant Examiner—Hal P. Wachsman
Attorney, Agent, or Firm—Trexler, Bushnell, Giangiorgi & Blackstone, Ltd.

[57] ABSTRACT

A method and apparatus for the dynamic characterisation of a cyclical process. Values of a dependent output variable and of a plurality of cyclically varying independent input variables of the process are monitored and the maximum and minimum values of the dependent output variable of the process in each of a plurality of successive cycles are detected and stored together with values of the independent variables at which the maxima and minima occurred. These values are normalised and subsequently used to synthesise dynamic characterisation descriptors which are applied to the input variables to simulate the process.

8 Claims, 3 Drawing Sheets

Normalised values

SELF-LEARNING METHOD AND APPARATUS FOR DYNAMIC SYSTEM CHARACTERISATION AND SIMULATION

BACKGROUND

This invention relates to a self-learning method and apparatus for dynamic system characterisation and simulation.

In general, mathematical modelling or simulation of dynamic systems in which there are significant lags between changes in input variable and consequent changes in an output variable is computationally intensive. Various self-learning adaptive processes have been proposed, but these tend to require very considerable data storage and very long learning periods are required. Furthermore, such systems cannot cope well with situations in which there are significant lags.

The applicant has established that, where the changes in the input variables are cyclic, a relatively simple technique for modelling the dynamic system can be used to give accurate predictions of the system behaviour.

OBJECTS AND SUMMARY

In accordance with one aspect of the present invention there is provided a method of obtaining a characterisation of a dynamic process having a plurality (n) of independent input variables and a dependent output variable, such method including the step of deriving and storing in each of a plurality (m) of cycles of each of the independent input variables:

(a) mid-point values of the independent input variable during the corresponding cycles;

(b) values dependent on the maximum value of the dependent output variable during the corresponding cycles;

(c) values dependent on the value of each independent input variable for which the dependent output variable was at a maximum in the corresponding cycles;

(d) values dependent on the value of each independent input variable for which the dependent output variable was at a minimum in the corresponding cycles;

and also deriving and storing a plurality of values of a base level of the dependent output variable derived at the end of each cycle from the most recent mid-point value of the dependent output variable, the most recent mid-point value of each independent input variable and the averages of the stored mid-point values of each of the independent input variables over the preceding m cycles, and the step of applying all such stored values over the preceding m cycles to the values of the independent input variables so as to synthesise a signal representing said dependent output variable.

Such stored values can be utilised to obtain model parameters which include a measure of the ratio of the dependent output variable amplitude to the independent input variable amplitude for each independent input variable, and the phase difference between the dependent output variable and each independent input variable which can subsequently be used to simulate the process.

Preferably, each independent input variable is allocated an input channel in which the maximum and minimum values of each one of the independent input and dependent output variables are temporarily stored together with the values of the corresponding variable at which the maxima and minima occur. Throughout each cycle the stored maxima and minima are compared with new values of the variables on sampling and the stored values are altered when required.

At the end of each cycle the values of steps (a), (b), (c) and (d) are obtained by means of a normalisation operation in which the values are rescaled to set the normalised maximum and minimum values of the independent input variable at +1 and −1 respectively.

The invention also resides in an apparatus for use in the determination of values characterising a dynamic process in which a dependent output variable is dependent on a plurality (n) of independent input variables, such apparatus comprising means for receiving input values of the dependent output and independent input variables, means for deriving from said input values and storing in each of a plurality (m) of cycles of each independent input variable:

(a) mid-point values of the independent input variable during the corresponding cycles;

(b) values dependent on the maximum value of the dependent output variable during the corresponding cycles;

(c) values dependent on the value of each independent input variable for which the dependent output variable was at a maximum in the corresponding cycles;

(d) values dependent on the value of each independent input variable for which the dependent output variable was at a minimum in the corresponding cycles;

and means for deriving from such stored values and storing a plurality of values of a base level of the dependent output variable derived at the end of each cycle from the most recent mid-point value of the dependent output variable, the most recent mid-point value of each independent input variable and the averages of the stored mid-point values of each of the independent input variables over the preceding m cycles, and means for applying all such stored values over the preceding m cycles to the values of the independent input variable so as to synthesise a signal representing said dependant output variable.

It has been found that as few as four cycles of each independent input variable can be adequate to provide an accurate characterisation of the process. Where each of the values in steps (a) to (d) is represented by a binary number a total of 128 bits per independent input variable and forty bits for the base level values are required to be stored. Further storage is, of course, required for temporary maximum and minimum value storage during determination of the cycle minima and maxima, but only six 8 bit values per channel have to be held.

The storage or memory requirements are therefore very small indeed compared with the memory necessary for proposed characterisation systems relying on conventional principles. Unlike conventional systems, the learning mode in the present method and apparatus is transparent to the rest of the operation and therefore does not slow down the operation.

BRIEF DESCRIPTION OF THE DRAWINGS

An example of the invention will now be described to illustrate better the principles of the invention. In the accompanying drawings.

DESCRIPTION

The method to be described is carried out in an electronic circuit specifically designed for the purpose. Specifically, it may be based on gate array integrated circuit or application specific integrated circuit configured to provide all the required functions. Part of the integrated circuit is configured to operate as a simple arithmetic processor using stored instructions which controls the writing of data into specified storage locations configured on the integrated circuit. Storage locations are associated with each of the blocks shown in FIG. 1 and will be explained one by one in the following detailed descriptions of those blocks.

Figure 1:
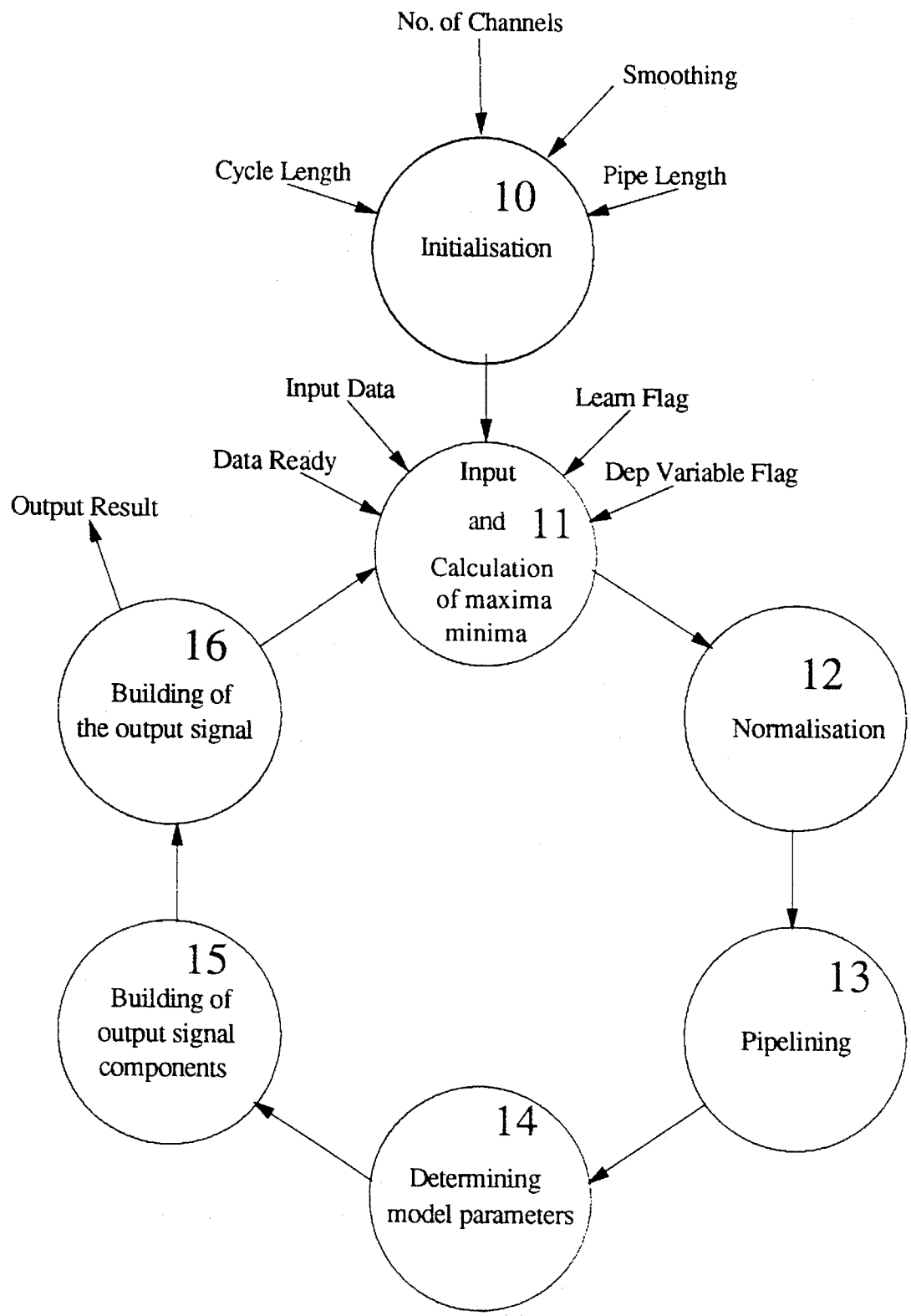
FIG. 1 is a block diagram showing the basic steps used in deriving characterisation values for a process and using such values for simulating progress of the process.

When the apparatus is first started it is necessary to carry out an initialisation stage in which signals relating to parameters of the process in question are input, either from permanent storage, or from manual input. Such signals signify the number of independent variables of the process (process driving functions), the cycle length for each variable (expressed as a number of sample intervals) and the length of a pipeline to be used for all channels. The pipeline will be explained in more detail hereinafter. Once initialised, the apparatus activates a series of modules arranged in a loop as shown in FIG. 1, various of the modules being skipped according to the operation being carried out at the time of the loop as will be explained hereinafter.

The first module 11, is executed at all stages of operation at every time-step. This module is responsible for accepting signals representing the current values of one of the independent variables and the dependent variable. For this purpose there are two eight-bit memory locations for the two input words. A channel address is sent immediately before each data byte. The channel address indicates the address at which the current maximum and minimum values for the channel in question are stored. For each channel there are six eight-bit memory locations for storing the maximum and minimum values of the associated independent variable and of the dependent variable in the current cycle of the independent variable, and the values of the associated independent variable at which the dependent variable was at its maximum and minimum values so far. If the time step is the first in a new cycle the values of the independent variable and the dependent variable are written into the associated memory location. On subsequent time steps, the arithmetic processor is used to compare the current values with the stored maxima and minima and to replace the values stored with current values where required. Thus, for example, if the current dependent variable value exceeds the maximum value currently stored, the maximum value stored and the corresponding independent variable value are replaced with the current values.

Figure 2:
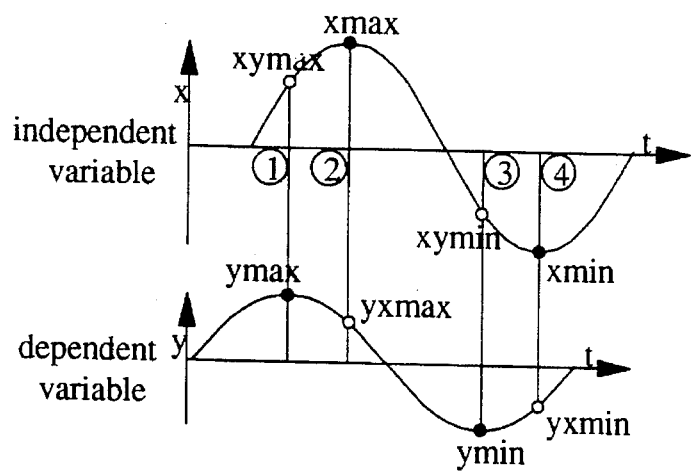
FIG. 2 is a graph showing a cycle of one of a plurality of independent variables of the process, the graph showing variation of both independent and dependent variables (x and y) with time.
Figure 3:
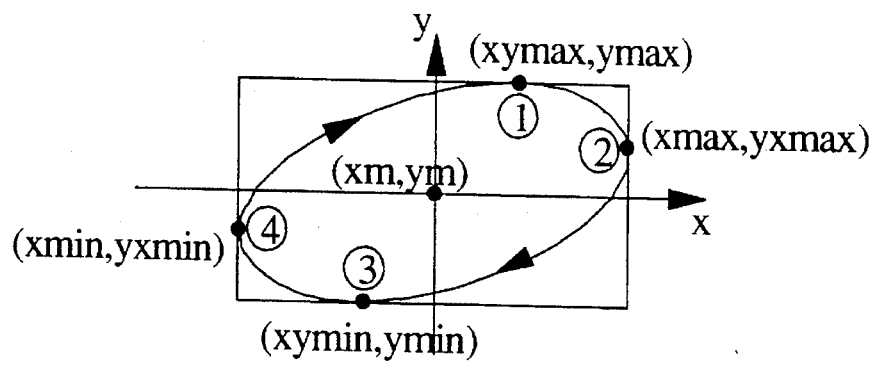
FIG. 3 is a graph showing the values of x and y for a single cycle.

FIGS. 2 and 3 show how the dependent variable and one of the independent variables change with time and relative to one another and illustrate how the various minima and maxima are interrelated. It should be noted that, although FIG. 3 shows a closed loop, this will not be the case in practice when other independent variables are changing. The curves may also, generally speaking be asymmetric.

Figure 4:
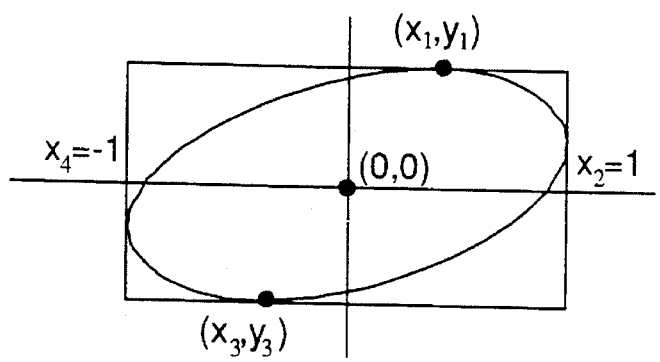
FIG. 4 is a graph like FIG. 3 but after normalisation.

The next module 12 in the loop is a normalisation stage. This is only executed if the last execution of module 11 was in respect of the final time-step of the cycle for the independent variable concerned. Normalisation involves re-scaling the maxima and minima so that the amplitude of the variation of the independent variable is unity. This is carried out in several stages. Firstly, mid-point values xm and ym for the independent and dependent variables are calculated halving the sum of the maximum value and the minimum value for each variable. This operation is carried out by the arithmetic processor. Next values $x_1$, $y_1$ and $x_3$ as shown in FIG. 4 are calculated using the formulae.

$$x_1 = \frac{xymax - xm}{xmax - xm}$$

$$y_1 = \frac{ymax - ym}{xmax - xm}$$

$$x_3 = \frac{xymin - xm}{xmax - xm}$$

$y_3 = -y_1$ (by definition of $xm$, $ym$)

In general, it should be noted that $x_3$ is not equal to $x_1$.

It will be noted that each of the first three calculations involves division by the same number xmax−xm. To avoid the need for the simple arithmetic processor to carry out division, a look-up table of reciprocal values is provided in ROM in the integrated circuit. This is used by the arithmetic processor to look up the value of 1/(xmax−xm) just once and this is then used in the three multiplication operations.

Figure 5:
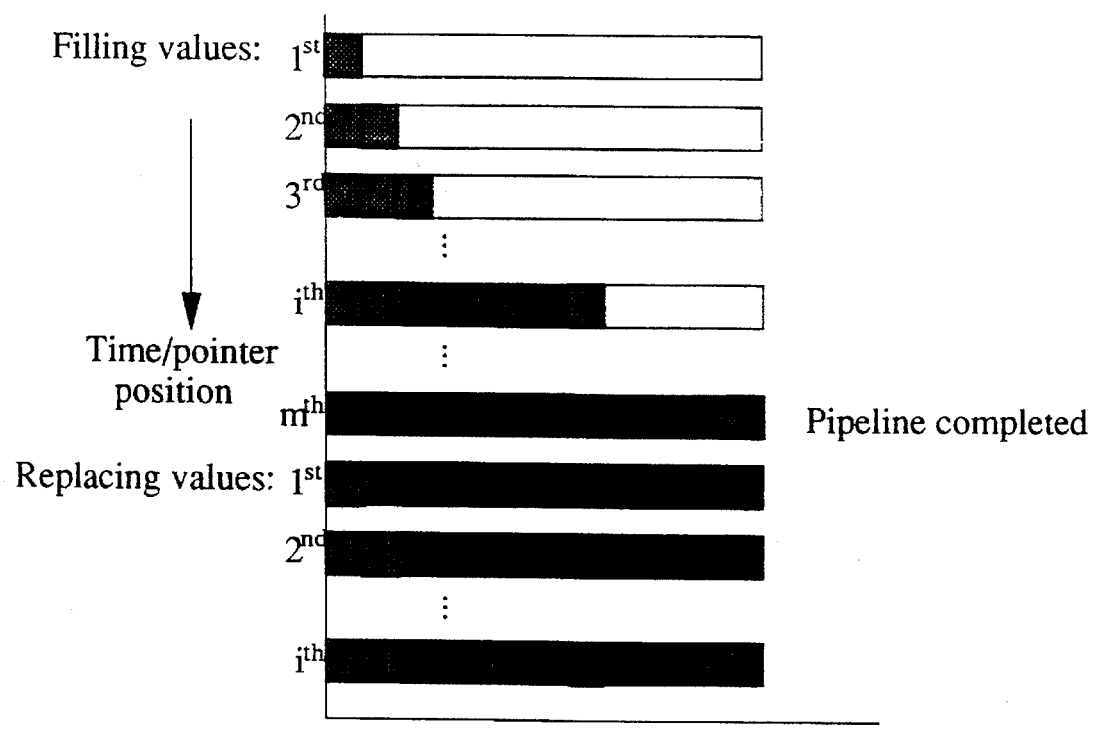
FIG. 5 is a diagram illustrating a data pipe lining operation which forms an important part of the method of the present invention.

Module 13, which is a first stage learning step, is responsible for storing newly calculated values of xm, $y_1$, $x_1$ and $x_3$ in a storage location for each channel, and it is executed at the end of each channel cycle. In the general case where the pipeline for each independent variable is m cycles long, the pipelining operation proceeds as shown in FIG. 5. In each cycle up to the mth, the newly calculated values of xm, $y_1$, $x_1$ and $x_3$ are stored at the ith address. The pipeline is filled with data after the mth storage operation. On the (m+1)th cycle the new data is written over that from the first cycle, on the (m+2)th over that from the second cycle and so on. At any time after the pipeline in respect of an independent variable is filled, therefore, it contains data in respect of the most recent m cycles. In the early stages of pipelining of data, before any pipeline is filled, no further operations are carried out in the pipelining module. However, once any pipeline is full a value xm1 is calculated for each channel as the new values are being stored. The formula for xm1 is $$xm1 = \frac{1}{16}\left[(xm)_i * xm1wt + \frac{1}{m}\sum_{j=1}^{m}(xm)_j * (16 - xm1wt)\right]$$

where $(xm)_i$ is the current value of xm and xm1wt is a weighting factor.

The summation is carried out in each cycle after the first by adding the current value $(xm)_i$ to the existing summation value and subtracting the value which is being replaced. Division by 2 and division by m (which is conveniently 4, 8 or 16) are carried out by bit shifting. The result of summation may be, for example, a twelve-bit number.

When all the pipelines are full, yet another operation is carried out in the pipelining module following the completion of each cycle of each independent variable. This involves the calculation and storing, in a separate memory location, values of a base level of the dependent variable. This is calculated by subtracting from the current value of ym the sum of the xm1 values of all the pipelines, i.e.

$$CONS = ym - \sum_{j=1}^{n} (xm1)_j$$

Module 14 is a second stage learning step which is executed only during learning after all pipelines are filled. It is executed at every cycle ending. For each channel four model parameter values are calculated. These are:

$$dec = \frac{1}{m} \sum_{j=1}^{m} (y_1)_j \quad (a)$$

where dec represents the average amplitude of the normalised $y_1$ values for the channel, $$ph = \frac{180}{\pi} \arccos \left[ \frac{1}{2m} \sum_{i=1}^{m} (x_1 - x_3)_i \right] \quad (b)$$

where ph represents the phase difference between the independent and dependent variables, $$cp = 1 + cyclength * \frac{ph}{C_1} \left[ 1 + \frac{ph}{C_2} \right] \quad (c)$$

where cp is the effective notional capacitance of the channel, cyclength is the cycle duration and $C_1$ and $C_2$ are empirically determined values. (In a practical example values of $C_1 = 1575$ and $C_2 = 500$ have been used) and $$norf = (1 + 4\pi^2 a^2) \text{ where } a = \frac{cp}{cyclelength} \quad (d)$$

norf being a compensation factor for a reduction in amplitude which occurs during output simulation.

Module 15 performs a first stage of the construction of an output signal simulating the dependent variable. It may be executed during learning once all pipelines have been filled or during output simulation when learning is turned off and the parameter values then used are those holding good when learning was stopped. A "presim" signal is built for each channel each time a new independent variable value dat is received.

$$presim = xm1 +$$

$$\frac{1}{n} \left[ \frac{1}{m} \sum_{i=1}^{m} (CONS)i + (dat - xm1) * norf * dec \right]$$

where n is the number of independent channels and the CONS term is averaged over the m cycles in the pipeline.

The final module 16 simulates the effect of the lag on the changes in the dependent variable following changes in the independent variables. For each channel there is another storage pipeline which holds values of the variable presim calculated as above for each of the previous four time steps.

The two oldest values $presim_{K1}$ and $presim_{K2}$ from this array are used in the equations $$Y_1^I = presim_{k2} + \frac{1}{cp} (presim_{k1} - presim_{k2})$$

$$Y_2^I = Y_2 + \frac{1}{cp} (Y_1^I - Y_2)$$

$$Y_3^I = Y_3 + \frac{1}{cp} (Y_2^I - Y_3)$$

$$Y_4^I = Y_4 + \frac{1}{cp} (Y_3^I - Y_4)$$

to produce a postsim value for the channel in which postsim = $Y_4^I$.

This is effectively the same as a four stage RC low-pass filter with unit resistors and capacitors of value cp. Finally the model output is the sum of the postsim values for all channels:

$$modres = \sum_{j=1}^{n} (postsim)_j$$

The system described uses very simple hardware with relatively little memory and in a computationally non-intensive manner to provide accurate prediction of variation in the dependent variable. It is of utility, for example, in the control of a building heating system in which building temperatures (output variables) measured at intervals can be correlated to daily, weekly and other variations in independent variables. It has the great advantage that the learning mode is transparent to the rest of the process which makes it suitable for real-time on-line operation. Moreover, a very short period is required to amass sufficient data for accurate simulation to be carried out. Moreover, should changed circumstances make the model parameters stored during learning obsolete, it is extremely simple to initiate the learning mode which will up-date the data stored rapidly and allow simulation to proceed uninterrupted.

The system described has the capability of unsupervised learning of characteristics of dynamic systems from noisy signals and consequent generalisation of these characteristics. The relationships between the inputs and the output are fragmented into individual relationships of input-output pairs through learning. Hence a sudden absence of one or more input signals will not affect the capability of the system to continue producing meaningful output.

This system described has the capability of coping with very large and sudden discontinuities of independent variables without losing the ability to predict the dependent variable. By virtue of the dynamic characteristics obtained through learning, it can be determined whether the relationship between current values of an independent—dependent variable pair falls outside these dynamic characteristics, and in such case can qualify this relationship as abnormal. This feature is considered to be useful for disaster handling applications.

By virtue of the said dynamic characteristics, the prediction of the dependent variable in the system described is entirely driven by the independent variables, and due to the cyclic nature of both independent and dependent variables where the latter may be either rising or falling at times when the former are/is rising and vice versa, the system will predict such rising or falling trends of the dependent variable.

The invention claimed is:

1. A method for obtaining a characterisation of a dynamic process having a plurality (n) of independent input variables and a dependent output variable, such method including the step of deriving and storing in each of a plurality (m) of cycles of each of the independent input variables:

(a) mid-point values of the independent input variable during the corresponding cycles;

(b) values dependent on the maximum value of the dependent output variable during the corresponding cycles:

(c) values dependent on the value of each independent input variable for which the dependent output variable was at a maximum in the corresponding cycles;

(d) values dependent on the value of each independent input variable for which the dependent output variable was at a minimum in the corresponding cycles;

and also deriving and storing a plurality of values of a base level of the dependent output variable derived at the end of each cycle from the most recent mid-point value of the dependent output variable, the most recent mid-point value of each independent input variable and the averages of the stored mid-point values of each of the independent input variables over the preceding m cycles, and the step of applying all such stored values over the preceding m cycles to the values of the independent input variables to synthesise a signal representing said dependent output variable.

2. A method as claimed in claim 1, in which said values of the independent input variables and the dependent output variable are sampled periodically, and stored, the most recent sample value of the dependent output variable is compared with previously stored maximum and minimum values, one of said previously stored maximum and minimum values being replaced by the most recent sample value when such most recent sample value represents a corresponding new maximum or minimum value.

3. A method as claimed in claim 1 in which, at the end of each cycle, the values of steps (a), (b), (c) and (d) are obtained by means of a normalisation operation in which the values derived during sampling are reseated to set normalised maximum and minimum of the independent input variable at +1 and −1 respectively.

4. A method as claimed in claim 1, further including pipelining said stored values in memory and overwriting the values obtained in a pth cycle by new values derived in the (p+m)th cycle.

5. Apparatus for use in the determination of values characterising a dynamic process in which a dependent output variable is dependent on a plurality (n) of independent input variables, such apparatus comprising means for receiving input values of the dependent output and independent input variables, means for deriving from said input values and storing in each of a plurality (m) of cycles of each independent input variable:

(a) mid-point values of the independent input variable during the corresponding cycles;

(b) values dependent on the maximum value of the dependent output variable during the corresponding cycles:

(c) values dependent on the value of each independent input variable for which the dependent output variable was at a maximum in the corresponding cycles;

(d) values dependent on the value of each independent input variable for which the dependent output variable was at a minimum in the corresponding cycles;

means for deriving from such stored values and storing a plurality of values of a base level of the dependent output variable derived at the end of each cycle from the most recent mid-point value of the dependent output variable, the most recent mid-point value of each independent input variable and the averages of the stored mid-point values of each of the independent input variables over the preceding m cycles, and means for applying all such stored values over the preceding m cycles to the values of the independent input variables to synthesise a signal representing said dependent output variable.

6. Apparatus as claimed in claim 5, in which said stored values are pipelined in memory, the values obtained in a pth cycle being overwritten by the new values derived in the (p+m)th cycle.

7. An apparatus as claimed in claim 5, in which said values of the independent input variables and the dependent output variable are sampled periodically, and stored, the most recent sample value of the dependent output variable is compared with previously stored maximum and minimum values, one of said previously stored maximum and minimum values being replaced by the most recent sample value when such most recent sample value represents a corresponding new maximum or minimum value.

8. An apparatus as claimed in claim 5 further including means for normalizing which, at the end of each cycle, obtains the values of (a), (b), (c) and (d) and rescales the values derived during sampling to a set normalised maximum and minimum of the independent input variable at +1 and −1, respectively.

* * * * *